United States Patent
Liu et al.

(10) Patent No.: US 8,195,669 B2
(45) Date of Patent: Jun. 5, 2012

(54) OPTIMIZING RANKING OF DOCUMENTS USING CONTINUOUS CONDITIONAL RANDOM FIELDS

(75) Inventors: Tie-Yan Liu, Beijing (CN); Tao Qin, Beijing (CN); Hang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 472 days.

(21) Appl. No.: 12/235,355

(22) Filed: Sep. 22, 2008

(65) Prior Publication Data

US 2010/0082613 A1    Apr. 1, 2010

(51) Int. Cl.
*G06F 7/00* (2006.01)
(52) U.S. Cl. ............................................. 707/748
(58) Field of Classification Search ........... 707/999.007, 707/748
See application file for complete search history.

(56) References Cited

U.S. PATENT DOCUMENTS

| | | | |
|---|---|---|---|
| 6,112,203 A | 8/2000 | Bharat et al. | |
| 6,738,764 B2 | 5/2004 | Mao et al. | |
| 7,216,123 B2 | 5/2007 | Kamvar et al. | |
| 7,231,399 B1 | 6/2007 | Bem et al. | |
| 7,376,649 B2 | 5/2008 | Yang et al. | |
| 2006/0129550 A1* | 6/2006 | Zha et al. ........................ | 707/5 |
| 2008/0010043 A1* | 1/2008 | Thiesson et al. ................ | 703/2 |
| 2008/0016050 A1 | 1/2008 | Stensmo | |
| 2008/0028010 A1 | 1/2008 | Ramsey | |
| 2008/0147641 A1 | 6/2008 | Leffingwell et al. | |

FOREIGN PATENT DOCUMENTS

EP    1462950    8/2007

OTHER PUBLICATIONS

Taskar et al., "Link Prediction in Relational Data," Learning Statistical Patterns in Relational Data Using Probabilistic Relational Models, Jan. 2005.*
Qin et al., "Subsite Retrieval: A Novel Concept for Topic Distillation," AIRS 2005, LNCS 3689, pp. 388-400, 2005.*
Burges, Chris et al., "Learning to Rank Using Gradient Descent," In Proceedings of the 22nd International Conference on Machine Learning, Bonn, Germany 2005, 8pages.
Calado, Pavel et al., "Local Versus Global Link Information in the Web," ACM Transactions on Information Systems, vol. 21, No. 1, Jan. 2003, pp. 42-63, http://delivery.acm.org/10.1145/640000/635486/p42-calado.pdf?key1=635486&key2=3697824121&coll=GUIDE&dl=GUIDE&CFID=33841681&CFTOKEN=98401367 [last accessed Dec. 17, 2008].
Cao, Zhe et al., "Learning to Rank: From Pairwise Approach to Listwise Approach," Microsoft technique report, ICML 2007, 9 pages, ftp://ftp.research.microsoft.com/pub/tr/TR-2007-40.pdf [last accessed Dec. 17, 2008].

(Continued)

*Primary Examiner* — Jensen Hu
(74) *Attorney, Agent, or Firm* — Perkins Coie LLP

(57) ABSTRACT

The present invention provides an improved method for ranking documents using a ranking model. One embodiment employs Continuous Conditional Random Fields (CRF) as a model, which is a conditional probability distribution representing a mapping relationship from retrieved documents to their ranking scores. The model can naturally utilize features of the content information of documents as well as the relation information between documents for global ranking. The present invention also provides a learning algorithm for creating Continuous CRF. Also provided, the invention introduces Pseudo Relevance Feedback and Topic Distillation.

21 Claims, 7 Drawing Sheets

OTHER PUBLICATIONS

Chu, Wei et al., "Gaussian Processes for Ordinal Regression," Journal of Machine Learning Research, vol. 6, 2004, pp. 1019-1041, http://www.gatsby.ucl.ac.uk/~zoubin/papers/chu05a.pdf [last accessed Dec. 17, 2008].

Diaz, Fernando, "Regularizing Query-Based Retrieval Scores," Information Retrieval, vol. 10, Issue 6, Dec. 2007, pp. 531-562, http://ciir.cs.umass.edu/~fdiaz/LSR-IR.pdf [last accessed Dec. 17, 2008].

Herbrich, Ralf et al., "Support Vector Learning for Ordinal Regression," Artificial Neural Networks, Sep. 7-10, 1999, Conference Publication No. 470, IEE 1999, pp. 97-102, http://ieeexplore.ieee.org/iel5/6633/17760/00819548.pdf?arnumber=819548 [last accessed Dec. 17, 2008].

Hersh, William et al., "OHSUMED: An Interactive Retrieval Evaluation and New Large Test Collection for Research," 1994, 192-201, http://medir.ohsu.edu/~hersh/sigir-94-ohsumed.pdf [last accessed Dec. 17, 2008].

Jarvelin, Kalervo et al., "Cumulated Gain-Based Evaluation of IR Techniques," ACM Transactions on Information Systems, vol. 20, No. 4, Oct. 2002, pp. 422-446, http://delivery.acm.org/10.1145/590000/582418/p422-jarvelin.pdf?key1=582418&key2=2828124121&coll=GUIDE&dl=GUIDE&CFID=74580549&CFTOKEN=57944676 [last accessed Dec. 17, 2008].

Joachims, Thorsten, "Optimizing Search Engines using Clickthrough Data," SIGKDD 02 Edmonton, Alberta, Canada, ACM 2002, 10 pages, http://www.cs.cornelledu/People/tj/publications/joachims_02c.pdf [last accessed Dec. 17, 2008].

Kleinberg, Jon, "Authoritative Sources in a Hyperlinked Environment," In Proceedings of the ACM-SIAM Symposium on Discrete Algorithms, 1998, 34 pages, http://www.cs.cornell.edu/home/kleinber/auth.pdf [last accessed Dec. 17, 2008].

Kwok, K.L, "A Document-Document Similarity Measure Based on Cited Titles and Probability Theory, and its Application to Relevance Feedback Retrieval," Proceedings of the 7th annual international ACM SIGIR conference on Research and development in information retrieval, 1984, pp. 221-231, http://delivery.acm.org/10.1145/640000/636819/p221-kwok.pdf?key1=636819&key2=7368124121&coll=GUIDE&dl=GUIDE&CFID=74581355&CFTOKEN=46971978 [last accessed Dec. 17, 2008].

Lafferty, John et al., "Conditional Random Fields: Probabilistic Models for Segmenting and Labeling Sequence Data," In Proc.18th International Conf. on Machine Learning, 2001, pp. 282-289, http://www.cis.upenn.edu/~pereira/papers/crf.pdf [last accessed Dec. 17, 2008].

Lewis, John, "ALGORITHM 582 The Gibbs-Poole-Stockmeyer and Gibbs-King Algorithms for Reordering Sparse Matrices," ACM Transactions on Methematical Software, vol. 8, No. 2, Jun. 1982, pp. 190-194, http://delivery.acm.org/10.1145/360000/355999/p190-lewis.pdf?key1=355999&key2=0788124121&coll=GUIDE&dl=GUIDE&CFID=33683384&CFTOKEN=12985660 [last accessed Dec. 17, 2008].

Liu, Tie-Yan et al., "LETOR: Benchmark Dataset for Research on Learning to Rank for Information Retrieval," SIGIR 2007 Workshop on Learning to Rank for Information Retrieval, pp. 3-10.

McCallum, Andrew et al., "Early Results for Named Entity Recognition with Conditional Random Fields, Feature Induction and Web-Enhanced Lexicons," Proceedings of the seventh conference on Natural language learning at HLT-NAACL 2003, vol. 4, pp. 188-191, http://www.cs.umass.edu/~mccallum/papers/mccallum-conll2003.pdf [last accessed Dec. 17, 2008].

McCallum, Andrew, "Efficiently Inducing Features of Conditional Random Fields," In Nineteenth Conference on Uncertainty in Artificial Intelligence, 2003, 8 pages, http://www.cs.umass.edu/~mccallum/papers/ifcrf-uai2003.pdf [last accessed Dec. 17, 2008].

Page, Lawrence et al, "The PageRank Citation Ranking: Bringing Order to the Web," Tech. rep., Stanford Digital Library Technologies Project, Jan. 29, 1998, 17 pages.

Pinto, David et al., "Table Extraction Using Conditional Random Fields," SIGIR'03, Jul. 28-Aug. 1, 2003, Toronto, Canada, ACM 2003, 8 pages, http://www.cs.umass.edu/~mccallum/papers/crft-able-sigir2003.pdf [last accessed Dec. 17, 2008].

Qin, Tao et al., "A Study of Relevance Propagation for Web Search," SIGIR'05, Aug. 15-19, 2005, Salvador, Brazil, ACM 2005, 10 pages.

Qin, Tao et al., "Ranking with Multiple Hyperplanes," Proceedings of the 30th annual international ACM SIGIR conference on Research and development in information retrieval, Jul. 23-27, 2007, pp. 279-286, http://delivery.acm.org/10.1145/1280000/1277791/p279-qin.pdf?key1=1277791&key2=4859124121&coll=GUIDE&dl=GUIDE&CFID=33685020&CFTOKEN=10273861 [last accessed Dec. 17, 2008].

Qin, Tao et al., "Topic Distillation Via Sub-Site Retrieval," Information Processing and Management International Journal, vol. 43, Issue 2, Mar. 2007, pp. 445-460.

Sha, Fei et al., "Shallow Parsing with Conditional Random Fields," Proceedings of the 2003 Conference of the North American Chapter of the Association for Computational Linguistics on Human Language Technology, vol. 1, 2003, pp. 134-141, http://www.cis.upenn.edu/~pereira/papers/shallow.pdf [last accessed Dec. 17, 2008].

Shakery, Azadeh et al., "A Probabilistic Relevance Propagation Model for Hypertext Retrieval," CIKM'06, Nov. 5-11, 2006, Arlington, Virginia, ACM 2006, 9 pages, http://sifaka.cs.uiuc.edu/czhai/pub/cikm06-prop.pdf [last accessed Dec. 17, 2008].

Smucker, Mark et al., "Find-similar: similarity browsing as a search tool," In SIGIR '06, pp. 461-468, 2006.

Sutton, Charles et al., "An Introduction to Conditional Random Fields for Relational Learning," Introduction to Statistical Relational Learning, chap. 4, MIT Press, Cambridge, MA., 2007, pp. 93-128, http://www.cs.umass.edu/~mccallum/papers/crf-tutorial.pdf [last accessed Dec. 17, 2008].

Tao, Tao et al., "Regularized Estimation of Mixture Models for Robust Pseudo-Relevance Feedback," SIGIR'06, Aug. 6-11, Seattle, WA, USA, ACM 2006, pp. 162-169, http://sifaka.cs.uiuc.edu/czhai/pub/sigir06-reg.pdf [last accessed Dec. 17, 2008].

Tsai, Ming-Feng et al., "FRank: A Ranking Method with Fidelity Loss," Proceedings of the 30th Annual International ACM SIGIR Conference, 2007, 10 pages, ftp://ftp.research.microsoft.com/pub/tr/TR-2006-155.pdf [last accessed Dec. 17, 2008].

Yue, Yisong et al., "A Support Vector Method for Optimizing Average Precision," SIGIR'07, Jul. 23-27, 2007, Amsterdam, The Netherlands, ACM 2007, 8 pages, http://www.cs.cornelledu/People/tj/publications/yue_etal_07a.pdf [last accessed Dec. 17, 2008].

Zhai, Cheng et al., "Beyond Independent Relevance: Methods and Evaluation Metrics for Subtopic Retrieval," SIGIR 2003, Toronto, Canada, ACM 2003, 8 pages, http://www.cs.cmu.edu/~wcohen/postscript/sigir-2003.pdf [last accessed Dec. 17, 2008].

Zheng, Zhaohui et al., "A Regression Framework for Learning Ranking Functions Using Relative Relevance Judgments," SIGIR'07, Jul. 23-27, 2007, Amsterdam, The Netherlands, ACM 2007, 8 pages, http://www.cc.gatech.edu/~zha/papers/fp086-zheng.pdf [last accessed Dec. 17, 2008].

Zhu, Jun et al., "2D Conditional Random Fields for Web Information Extraction," In Proceedings of the 22nd International Conference on Machine Learning, Bonn, Germany, 2005, 8 pages, http://www.machinelearning.org/proceedings/icml2005/papers/132_2DConditionalRandomFields_ZhuEtAl.pdf [last accessed Dec. 17, 2008].

Zhu, Jun et al., "Simultaneous Record Detection and Attribute Labeling in Web Data Extraction," KDD'06, Aug. 20-23, 2006, Philadelphia, Pennsylvania, USA, ACM 2006, 10 pages, ftp://ftp.research.microsoft.com/pub/tr/TR-2006-69.pdf [last accessed Dec. 17, 2008].

* cited by examiner

Algorithm 1 Learning Algorithm of Continuous CRF for Pseudo Relevance Feedback

---

Input: training data $\{(x^{(1)}, y^{(1)}, S^{(1)}), (x^{(2)}, y^{(2)}, S^{(2)}), \ldots, (x^{(N)}, y^{(N)}, S^{(N)})\}$ Parameter: number of iterations $T$ and learning rate $\eta$ Initialize parameter $\log \alpha_k$ and $\log \beta$ for $t = 1$ to $T$ do
   for $i = 1$ to $N$ do
     Compute gradient $\nabla_{\log \alpha_k}$ and $\nabla_{\log \beta}$ using Eq. (13) and (14)
     for a single query $(x^{(i)}, S^{(i)}, y^{(i)})$.
     Update $\log \alpha_k = \log \alpha_k + \eta \times \nabla_{\log \alpha_k}$ and $\log \beta = \log \beta + \eta \times \nabla_{\log \beta}$
   end for
end for Output parameters of CRF model $\alpha_k$ and $\beta$.

*FIG. 3*

Table 1: Ranking Accuracy on OHSUMED

| Algorithms | ndcg1 | ndcg2 | ndcg3 | ndcg5 | ndcg10 |
|---|---|---|---|---|---|
| BM25 | 0.3994 | 0.3931 | 0.3939 | 0.3972 | 0.3967 |
| PRF | 0.3962 | 0.4277 | 0.4104 | 0.3981 | 0.3925 |
| RankSVM | 0.4952 | 0.4755 | 0.4649 | 0.4579 | 0.4411 |
| ListNet | 0.5231 | 0.497 | 0.4777 | 0.4662 | 0.4489 |
| RankSVM+R | 0.5143 | 0.4676 | 0.462 | 0.4593 | 0.4431 |
| ListNet+R | 0.5391 | 0.4946 | 0.4663 | 0.4555 | 0.4308 |
| CRF | 0.5443 | 0.4986 | 0.4881 | 0.4808 | 0.4537 |

*FIG. 4*

Table 2: Top 10 Results of RankSVM

| Doc ID | Title |
|---|---|
| 184771 | The pseudoradicular syndrome. Lower extremity peripheral nerve entrapment masquerading as lumbar radiculopathy. |
| 188516 | Infections caused by central venous catheters in patients with acquired immunodeficiency syndrome. |
| 277424 | A randomized double-blind prospective study of the efficacy of pulsed electromagnetic fields for interbody lumbar fusions. |
| 169405 | No clinical effect of back schools in an HMO. A randomized prospective trial. |
| 93130 | The relationship between leg length discrepancy and lumbar facet orientation. |
| 217695 | Lumbar intraspinal synovial cysts. Recognition and CT diagnosis [see comments] |
| 171218 | Pain provocation and disc deterioration by age. A CT/discography study in a low-back pain population. |
| 189343 | Metaplastic proliferative fibrocartilage as an alternative concept to herniated intervertebral disc. |
| 255894 | Thoracic and lumbar spine trauma. |
| 202875 | Macroamylasemia: a simple stepwise approach to diagnosis [see comments] |

*FIG. 5*

Table 3: Top 10 Results of CRF

| Doc ID | Title |
|---|---|
| 184771 | The pseudoradicular syndrome. Lower extremity peripheral nerve entrapment masquerading as lumbar radiculopathy. |
| 277424 | A randomized double-blind prospective study of the efficacy of pulsed electromagnetic fields for interbody lumbar fusions. |
| 188516 | Infections caused by central venous catheters in patients with acquired immunodeficiency syndrome. |
| 189343 | Metaplastic proliferative fibrocartilage as an alternative concept to herniated intervertebral disc. |
| 169405 | No clinical effect of back schools in an HMO. A randomized prospective trial. |
| 262357 | Intramuscular depot methylprednisolone induction of chrysotherapy in rheumatoid arthritis: a 24-week randomized controlled trial. |
| 249197 | A prospective study of nerve root infiltration in the diagnosis of sciatica. A comparison with radiculogrphy, computed tomography, and operative findings. |
| 254602 | The neuroradiographic diagnosis of lumbar herniated nucleus pulposus: II. A comparison of computed tomography (CT). myelography, CT-myelography, and magnetic resonance imaging. |
| 217695 | Lumbar intraspinal synovial cysts. Recognition and CT diagnosis |
| 255894 | Thoracic and lumbar spine trauma. |

*FIG. 6*

Table 4: Ranking Accuracy on TREC2004

| Algorithms | ndcg1 | ndcg2 | ndcg3 | ndcg5 | ndcg10 |
|---|---|---|---|---|---|
| BM25 | 0.3067 | 0.2933 | 0.2578 | 0.2293 | 0.1747 |
| ST | 0.3200 | 0.3133 | 0.3111 | 0.3232 | 0.3452 |
| SS | 0.3200 | 0.3200 | 0.3130 | 0.3227 | 0.3440 |
| RankSVM | 0.4400 | 0.4333 | 0.4092 | 0.3935 | 0.4201 |
| ListNet | 0.4400 | 0.4267 | 0.4371 | 0.4209 | 0.4579 |
| RankSVM+R | 0.4933 | 0.4200 | 0.4118 | 0.4027 | 0.4197 |
| ListNet+R | 0.4400 | 0.4467 | 0.4481 | 0.4327 | 0.4591 |
| CRF | 0.5200 | 0.4733 | 0.4552 | 0.4428 | 0.4604 |

*FIG. 7*

OPTIMIZING RANKING OF DOCUMENTS USING CONTINUOUS CONDITIONAL RANDOM FIELDS

BACKGROUND

Ranking is a central topic in the field of search mainly because the performance of a search system can be evaluated by the accuracy of its ranking results. Traditionally, a ranking model is defined as a function of a query and a document, which represents the relevance of the document with respect to the query. In search, when given a query, the ranking model assigns a score to each of the documents retrieved with the query and produces the ranked list of documents sorted by the scores. The ranking model is typically a local model in the sense that the creation and utilization of the model only needs the involvement of a single document.

As search evolves, more and more useful information for ranking becomes available. This includes the content information of documents as well as the relation information between documents. The relations can be hyperlinks between documents, similarities between documents, etc. Ideally, the ranking model would be a function of the query and all the retrieved documents with the query. That is to say, ranking should be conducted on the basis of the contents of documents as well as the relations between documents.

SUMMARY

In view of the above-described needs, the present invention provides an improved method for ranking documents using a ranking model. As described in detail below, one embodiment of the present invention employs Continuous Conditional Random Fields (CRF) as a model, which is a conditional probability distribution representing a mapping relationship from retrieved documents to their ranking scores. The model can naturally utilize features of the content information of documents as well as the relation information between documents for global ranking. The present invention also provides a learning algorithm for creating Continuous CRF. Also provided, the invention introduces Pseudo Relevance Feedback and Topic Distillation.

In one specific embodiment, the invention provides an improved method for ranking documents using a ranking model. The method includes the step of obtaining a number of documents and queries, where each query is associated with some documents. In addition, ground truth data, the document's features and relations, are also included. The labels include data that describes relationships between the documents. Using the relationship data, the method then maximizes a likelihood figure by employing a gradient ascent. The method then uses the likelihood to modify parameters of a ranking model. Once the parameters are established, the method ranks the documents by the use of the parameters. The method makes the ranking of the documents more consistent with the document label data.

In other embodiments, the present invention produces the likelihood figure by the use of specific functions. One specific function is configured to sort label data that describes content similarity relationships. Another specific function is configured to sort label data that describes parent-child relationships.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 illustrates a description of a learning algorithm.
FIG. 4 illustrates a table of ranking accuracy data.
FIG. 5 illustrates a table of the top 10 results of RankSVM.
FIG. 6 illustrates a table of the top 10 results of CRF.
FIG. 7 illustrates a table of ranking accuracy data of TRE2004.

DETAILED DESCRIPTION

Figure 1:
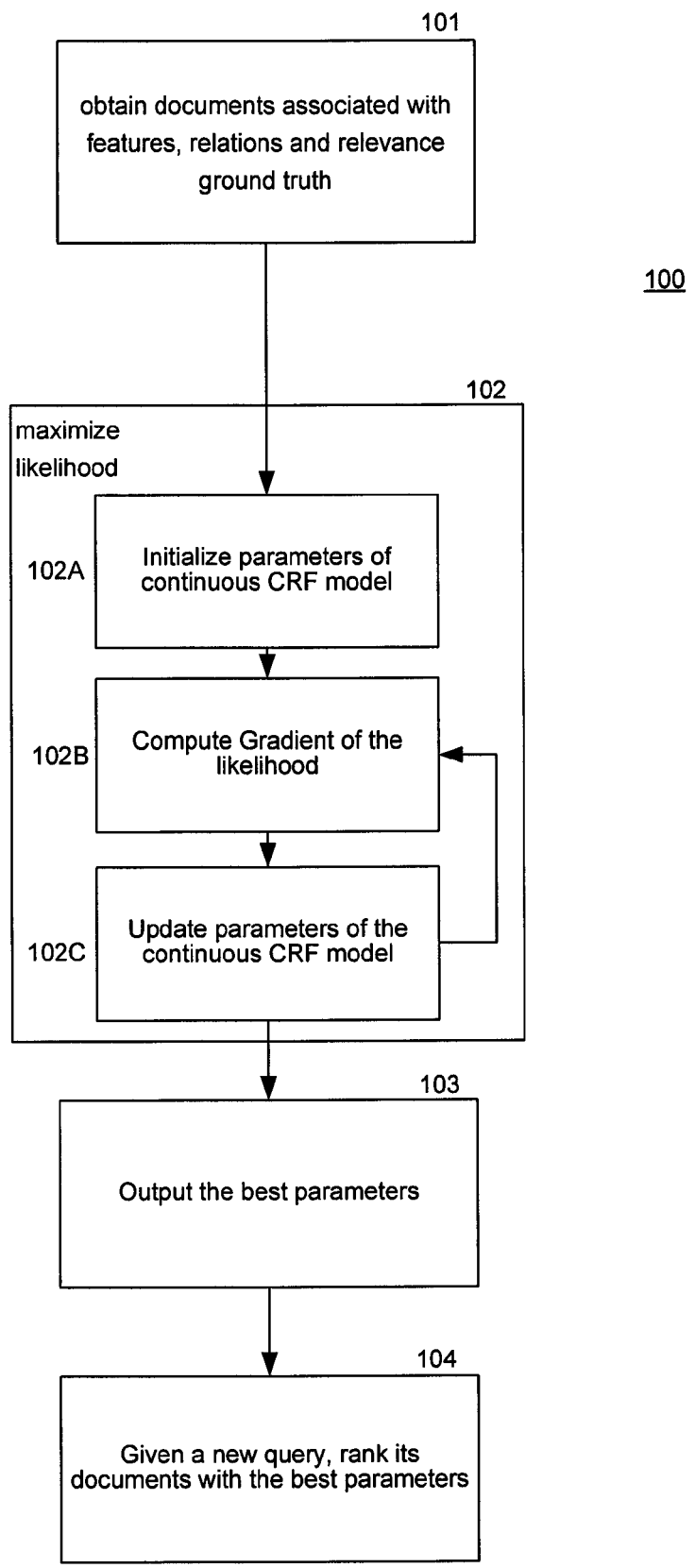
FIG. 1 illustrates a flow diagram of one embodiment of a ranking method in accordance with the present invention.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "evaluator," "sensor," "device," "cloud," "network," "optimizer," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

The detailed description below first provides a description of embodiments of the present invention. The sections that follow disclose a formal definition of the problem of global ranking, then describes additional details of the methods that employ a Continuous CRF model for conducting global ranking.

The present invention provides an improved method for ranking documents using a ranking model. As described in detail below, one embodiment of the present invention employs Continuous Conditional Random Fields (CRF) as a model, which is a conditional probability distribution representing a mapping relationship from retrieved documents to their ranking scores. The model can naturally utilize features of the content information of documents as well as the relation information between documents for global ranking. The present invention also provides a learning algorithm for creating Continuous CRF. Also provided, the invention introduces Pseudo Relevance Feedback and Topic Distillation.

In one specific embodiment, the invention provides an improved method for ranking documents using a ranking model. With reference to FIG. 1, a method 100 of the embodiment is illustrated and described below. The method 100 starts at block 101 where the system embodying the invention obtains documents and label data. The received data may provide an indication of the relationships between the documents, ground truth data, as well as other metadata. As shown in block 102, the method includes the step of using the received data to maximize a likelihood figure by employing a gradient ascent. As shown in blocks 102A, 102B and 102C, there are several sub-steps in likelihood maximization. As shown, the method first initializes the parameters of the CRF model, then iteratively computes the gradient of the likelihood and updates the parameters (102B and 102C). The method, as shown in block 103, then outputs the best parameters. Once the best parameters are established, as shown in block 104, the method uses the best parameters in the training set to rank new queries that are given.

In other embodiments, the present invention produces the likelihood figure by the use of specific functions. One specific function is configured to sort label data that describes content similarity relationships. Another specific function is configured to sort label data that describes parent-child relationships. Details of each step of this embodiment follow a brief description of the background technology.

The Continuous CRF model is defined as a conditional probability distribution representing the mapping relationship from the retrieved documents to their ranking scores, where the ranking scores are represented by continuous variables. In Continuous CRF, we make use of both content information and relation information as features. The model is general in the sense that various types of relations for global ranking can be incorporated as features. We further propose a learning method for training Continuous CRF. Specifically, we use Maximum Likelihood Estimation and Gradient Ascent for parameter estimation. Our learning method turns out to be a novel learning-to-rank method for global ranking, in contrast to the exiting learning-to-rank methods which are by design local ranking methods. We apply Continuous CRF to Pseudo Relevance Feedback and Topic Distillation.

As a matter of background, this section briefly describes existing work in the field. Traditionally, document ranking was only conducted locally, in the sense that the ranking model is a function of a query and a single document. Although this makes the ranking model easy to create and use, its limitation is also clear. There is a large amount of in-formation which is useful for ranking, but is not local, for example, the relation information between documents.

Relation information between documents plays an important role in many information retrieval tasks. For example, ranking web pages on the basis of importance, improving relevance ranking by using similarity information, and diversifying search results.

Relation information has been used for importance ranking in web search. PageRank and HITS are well known algorithms for computing importance of web pages. They rank web pages based on the Markov chain model and authority-hub model respectively; both leverage the hyperlink (relation) information between web pages.

Topic Distillation is another example of using relation information in web search. Here, Topic Distillation refers to the search task in which one selects a page that can best represent the topic of the query from a web site by using structure (relation) information of the site. If both a page and its parent page are concerned with the topic, then the parent page is to be ranked higher. It is found that propagating the relevance of a web page to its neighborhood through the hyperlink graph can improve the accuracy of Topic Distillation. Furthermore, propagating the relevance of a web page to its parent page can also boost the accuracy.

Similarity between documents is useful information for relevance search. In Pseudo Relevance Feedback, we first conduct a round of relevance ranking, assuming that the top ranked documents are relevant; then conduct another round of ranking, using similarity information between the top ranked documents and the other documents, and boost some relevant documents dropped in the first round. Existing Pseudo Relevance Feedback methods can be clustered into two groups. In one group, the documents are ranked first based on relevance. Then, the top results are used to make an expansion of the query and the re-ranking with the expanded query is performed. In the other group, it is assumed that similar documents are likely to have similar ranking scores, and documents are re-ranked based on the similarities between documents.

In Subtopic Retrieval one also utilizes document similarity information. In the task, given a query, the returned documents should cover as many subtopics as possible. If there are multiple documents about the same subtopic, then only one document should be selected and ranked high. Although relation information between documents has been used in search, so far there has been no previous work which generalizes the specific ranking tasks.

Recently machine learning technologies called 'learning to rank' have been applied to information retrieval. In the approach, supervised learning is employed in ranking model construction. Previous work demonstrates that learning to rank has certain advantages when compared with the traditional non-learning approaches.

Previously people have tried to transform the problem of ranking into that of classification and apply existing classification techniques to the task. This is called the pairwise approach in the literature. For example, as classification techniques one can employ SVM and Neural Network, and derive the methods of RankSVM and RankNet. More recently, a number of authors have proposed directly defining a loss function on list of objects and optimizing the loss function in learning. This listwise approach formalizes the ranking problem in a more straightforward way and thus appears to be more effective.

Existing learning to rank methods do not consider using the relation information between objects (documents) in the models. As a result, they are not directly applicable to the cases in which relation information should be used. Making extensions of existing methods on the basis of heuristics would not work well, as will be seen in the experiment section.

Conditional Random Fields (CRF) is a discriminative model for sequence data prediction. It is defined as a conditional probability distribution of output label sequence given input observation sequence. The conditional probability distribution is an exponential model containing features based on both the input and output. It is assumed that there exists dependency between the adjacent labels in the output.

Document ranking in search is a problem as follows. When the user submits a query, the search system retrieves all the documents containing the query, calculates a ranking score for each of the documents using the ranking model, and sorts the documents according to the ranking scores. The scores determine the ranking orders of documents, and can represent relevance, importance, and/or diversity of documents.

Let q denote a query. Let $d^{(q)}=\{d_1^{(q)}, d_2^{(q)}, \ldots, d_{n_{(q)}}^{(q)}\}$ denote the documents retrieved with q, and $y^{(q)}=\{y_1^{(q)}, y_2^{(q)}, \ldots, y_{n_{(q)}}^{(q)}\}$ denote the ranking scores assigned to the documents. Here $n_{(q)}$ stands for number of documents retrieved with q. Note that the numbers of documents vary according to queries. We assume that $y^{(q)}$ is determined by a ranking model.

We call the ranking 'local ranking,' if the ranking model is defined as $$y_i^{(q)} = f(q, d_i^{(q)}), i=1, \ldots, n_{(q)} \quad (1)$$

Furthermore, we call the ranking 'global ranking,' if the ranking model is defined as $$y^{(q)} = F(q, d^{(q)}) \quad (2)$$

The major difference between the two is that F takes on all the documents as input, while f takes on individual documents as input. Note global ranking contains local ranking as its special case. Intuitively, in local ranking we look at the documents individually, while in global ranking we treat the documents as a whole. In global ranking, we use not only the content information of documents but also the relation information between documents. There are many specific application tasks that can be viewed as examples of global ranking. These include Pseudo Relevance Feedback, Topic Distillation, and Subtopic Retrieval.

The present invention provides a learning to rank method for global ranking, using Continuous CRF as model. Let $x=\{x_1, x_2, \ldots, x_n\}$ denotes the input vectors of the documents retrieved with the query, $y=\{y_1, y_2, \ldots, y_n\}$ denotes the ranking scores assigned to the documents, and R denotes the relation between the documents (and also the ranking scores of the documents). Here n stands for number of documents retrieved by the query and $x_i \in \Re^{K_1}, y_i \in \Re, i=1,2,\ldots,n$ and K1 is an integer. Note that in this paper we call x input vector, not feature vector, in order to distinguish it from the feature functions in the CRF model. Let $\theta=\{\alpha, \beta\}, \alpha \in \Re^{K_1}, \beta \in \Re^{K_2}$ be a vector of parameters respectively, where $K_2$ is an integer. Let $\{f_k(y_i, x)\}_{k=1}^{K_1}$ be a set of real-valued feature functions defined on x and $y_i(i=1,\ldots,n)$ and $\{g_k(y_i, y_j, x)\}_{k=1}^{K_2}$ be a set of real-valued feature functions defined on $y_i, y_j$, and $x(i=1,\ldots,n, j=1,\ldots,n, i \neq j)$.

Continuous Conditional Random Fields (CRF) is a conditional probability distribution with density function:

$$Pr(y|x) = \frac{1}{Z(x)} \exp\left\{\sum_i \sum_{k=1}^{K_1} \alpha_k f_k(y_i, x) + \sum_{i,j} \sum_{k=1}^{K_2} \beta_k g_k(y_i, y_j, x)\right\}, \quad (3)$$

where Z(x) is a normalization function $$Z(x) = \int_y \exp\left\{\sum_i \sum_{k=1}^{K_1} \alpha_k f_k(y_i, x) + \sum_{i,j} \sum_{k=1}^{K_2} \beta_k g_k(y_i, y_j, x)\right\} dy. \quad (4)$$

Figure 2:
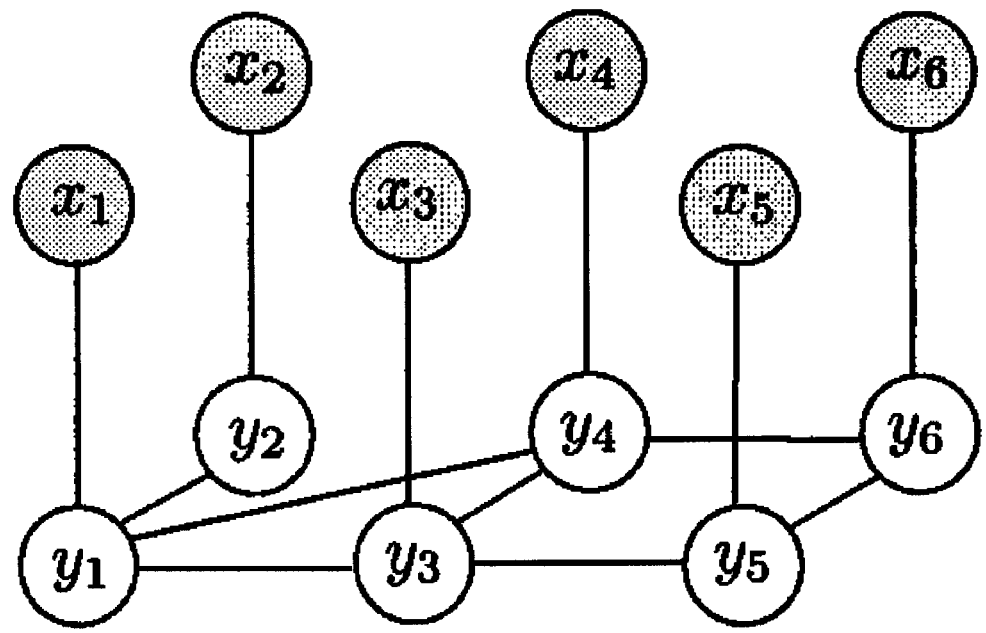
FIG. 2 illustrates a CRF Model.

Continuous CRF is a graphical model, as depicted in FIG. 2. In the conditioned undirected graph, a white vertex represents a ranking score, a gray vertex represents an input vector, an edge between two white vertexes represents relation between ranking scores, and an edge between a gray vertex and a white vertex represents dependency of ranking score on input vector. In principle a ranking score can depend on all the input vectors; here for ease of presentation we only consider the simplified case in which it depends only on the corresponding input vector.

In Continuous CRF, feature function $f_k$ represents the dependency between the ranking score of a document and the input vector of the document, and feature function $g_k$ represents the relationship between the ranking scores of two documents (e.g. similarity relation, parent-child relation). We call the feature functions $f_k$ vertex features, and the feature functions $g_k$ edge features. The edge feature functions are determined by the relation R. Different retrieval tasks have different definitions on R, as is explained below.

There are clear differences between the conventional CRF and the Continuous CRF proposed here. (1) The conventional CRF is usually defined on a chain while Continuous CRF is defined on a graph. (2) In the conventional CRF random variable y is discrete while in Continuous CRF y is continuous. This makes the inference of Continuous CRF is different from that of conventional CRF, as described below. The R in Continuous CRF defines the relations between ranking scores as well as specifies the corresponding feature function $g_k$. An R is associated with a query and different queries may have different R's.

In learning, given training data we estimate the parameters $\theta=\{\alpha, \beta\}$ of Continuous CRF. Suppose that the training data $\{x^{(q)}, y^{(q)}\}_{q=1}^N$ is generated i.i.d. from a unknown probability distribution, where each $x^{(q)}=\{x_1^{(q)}, x_2^{(q)}, \ldots, x_{n(q)}^{(q)}\}$ is a set of input vectors associated with the documents of query q, and each $y^{(q)}=\{y_1^{(q)}, y_2^{(q)}, \ldots, y_{n(q)}^{(q)}\}$ is a set of ranking scores associated with the documents of query q. Note that we do not assume that the documents of a query are generated i.i.d. Further suppose that the relation data $\{R^{(q)}\}_{q=1}^N$ is given, where each $R^{(q)}$ is a set of relations on the documents (ranking scores) of query q.

We employ Maximum Likelihood Estimation to estimate the parameters. Specifically, we calculate the conditional log likelihood of the data with respect to the Continuous CRF model.

$$L(\theta) = \sum_{q=1}^N \log Pr(y^{(q)} | x^{(q)}; \theta). \quad (5)$$

Specifically, $$L(\theta) = \sum_{q=1}^N \left\{\sum_i \sum_{k=1}^{K_1} \alpha_k f_k(y_i^{(q)}, x^{(q)}) + \sum_{i,j} \sum_{k=1}^{K_2} \beta_k g_k(y_i^{(q)}, y_j^{(q)}, x^{(q)})\right\} - \quad (6)$$

$$\sum_{q=1}^{N} \log Z(x^{(q)}).$$

We take the parameter $\hat{\theta}$ that can maximize the log likelihood function as output. We know of no analytic solution to the optimization problem. We can employ the numerical method of Gradient Ascent to solve it.

In inference, given new data x and relation R we use the model with estimated parameter $\hat{\theta}$ to calculate the conditional probability $Pr(y|x)$ and select the y satisfying $$y = \operatorname*{argmax}_{y} Pr(y \mid x; \hat{\theta}) \quad (7)$$

$$= \operatorname*{argmax}_{y} \left\{ \sum_{i} \sum_{k=1}^{K1} \hat{\alpha}_k f_k(y_i, x) + \sum_{i,j} \sum_{k=1}^{K2} \hat{\beta}_k g_k(y_i, y_j, x) \right\}.$$

Equation (7) then becomes the ranking model.

In this section shows how to apply Continuous CRF to two global ranking tasks. Here we consider a method of using Continuous CRF for Pseudo Relevance Feedback, which belongs to the second group of existing methods. In fact, the method combines the two rounds of ranking of Pseudo Relevance Feedback into one by using the Continuous CRF model. In the method the similarities between any two documents are given and the input vectors are also defined. What we need to do is to specify the feature functions.

For each component in the input vector, we introduce a vertex feature function. Suppose that $x_{i,k}$ is the k-th component of input vector $x_i$, we define the k-th feature function $f_k(y_i, x)$ as $$f_k(y_i, x) = -(y_i - x_{i,k})^2. \quad (8)$$

Next, we introduce one (and only one) edge feature function.

$$g(y_i, y_j, x) = -\frac{1}{2} S_{i,j}(y_i - y_j)^2, \quad (9)$$

where $S_{i,j}$ is similarity between documents $d_i$ and $d_j$. The larger $S_{i,j}$ is, the more similar the two documents are. Here the relation is represented by a matrix S, whose element in i-th row and j-th column is $S_{i,j}$. Note that this specific feature function does not depend on x.

The Continuous CRF for Pseudo Relevance Feedback then becomes $$Pr(y \mid x) = \frac{1}{Z(x)} \exp\left\{ \sum_{i} \sum_{k=1}^{K1} -\alpha_k (y_i - x_{i,k})^2 + \sum_{i,j} -\frac{\beta}{2} S_{i,j}(y_i - y_j)^2 \right\}, \quad (10)$$

where $Z(x)$ is defined as $$Z(x) = \int_y \exp\left\{ \sum_{i} \sum_{k=1}^{K1} -\alpha_k (y_i - x_{i,k})^2 + \sum_{i,j} -\frac{\beta}{2} S_{i,j}(y_i - y_j)^2 \right\} dy. \quad (11)$$

To guarantee that $$\exp\left\{ \sum_{i} \sum_{k=1}^{K1} -\alpha_k (y_i - x_{i,k})^2 + \sum_{i,j} -\frac{\beta}{2} S_{i,j}(y_i - y_j)^2 \right\}$$

is integrable, we must have $\alpha_k > 0$ and $\beta > 0$.

The Continuous CRF can naturally model Pseudo Relevance Feed-back. First, if the value of $X_{i,k}$ is high, then the value of $y_i$ is high with high probability. (For example, $x_{i,k}$ can be a feature representing tf–idf.) Second, if the value of $S_{i,j}$ is large, then ranking scores $y_i$ and $y_j$ are close with high probability.

With some derivation, we obtain $$Z(x) = (2\pi)^{\frac{n}{2}} |2A|^{-\frac{1}{2}} \exp(b^T A^{-1} b - c), \quad (12)$$

where $A = \alpha^T eI + \beta D - \beta S$, D is an n×n diagonal matrix with $$D_{i,i} = \sum_{j} S_{i,j}, I$$

is an n×n matrix, $|A|$ is determinant of matrix $$A, b = X\alpha, c = \sum_{i} \sum_{k=1}^{K1} \alpha_k x_{i,k}^2,$$

and X is a matrix whose i-th row k-th column element is $x_{i,k}$.

In learning, we try to maximize the log likelihood. Note that maximization of $L(\theta)$ in Eq. (6) is a constrained optimization problem because we need to guarantee that $a_k > 0$ and $\beta > 0$. Gradient Ascent cannot be directly applied to a constrained optimization problem. Here we adopt a technique similar to that in and then employ Gradient Ascent. Specifically, we maximize $L(\theta)$ with respect to $\log \alpha_k$ and $\log \beta$ instead of $\alpha_k$ and $\beta$. As a result, the new optimization issue becomes unconstrained.

The gradients of $L(\theta)$ with respect to $\log \alpha_k$ and $\log \beta$ are computed as follows.

$$\nabla_{\log \alpha_k} = \frac{\partial L(\theta)}{\partial \log \alpha_k} = -\alpha_k \sum_{q=1}^{N} \left\{ \sum_{i} (y_i^{(q)} - x_{i,k}^{(q)})^2 + \frac{\partial \log Z(x^{(q)})}{\partial \alpha_k} \right\} \quad (13)$$

$$\nabla_{\log \beta} = \frac{\partial L(\theta)}{\partial \log \beta} = -\beta \sum_{q=1}^{N} \left\{ \sum_{i,j} \frac{1}{2} S_{i,j}^{(q)} (y_i^{(q)} - y_j^{(q)})^2 + \frac{\partial \log Z(x^{(q)})}{\partial \beta} \right\} \quad (14)$$

Now we show how to get the partial derivative $$\frac{\partial \log Z(x^{(q)})}{\partial \alpha_k} \text{ and } \frac{\partial \log Z(x^{(q)})}{\partial \beta}.$$

For simplicity, we omit the super script (q) in the equations hereafter. First $$\frac{\partial \log Z(x)}{\partial \alpha_k} = -\frac{1}{2|A|}\frac{\partial |A|}{\partial \alpha_k} + \frac{\partial b^T A^{-1} b}{\partial \alpha_k} - \frac{\partial c}{\partial \alpha_k} \quad (15)$$

$$\frac{\partial \log Z(x)}{\partial \beta} = -\frac{1}{2|A|}\frac{\partial |A|}{\partial \beta} + \frac{\partial b^T A^{-1} b}{\partial \beta} \quad (16)$$

Furthermore, $$\frac{\partial |A|}{\partial \alpha_k} = |A|(A^{-T}) :^T \frac{\partial A}{\partial \alpha_k} := |A|(A^{-T}) :^T I; \quad (17)$$

$$\frac{\partial |A|}{\partial \beta} = |A|(A^{-T}) :^T \frac{\partial A}{\partial \beta} := |A|(A^{-T}) :^T (D-S); \quad (18)$$

$$\frac{\partial b^T A^{-1} b}{\partial \alpha_k} = X_{\cdot k}^T A^{-1} b - b^T A^{-1} A^{-1} b + b^T A^{-1} X_{\cdot k} \quad (19)$$

$$\frac{\partial b^T A^{-1} b}{\partial \beta} = -b^T A^{-1}(D-S)A^{-1} b, \quad (20)$$

where X: denotes the long column vector formed by concatenating the columns of matrix X, and $X_{\cdot k}$ denotes the k-th column of matrix X. For example, if $$X = \begin{bmatrix} 1 & 3 \\ 2 & 4 \end{bmatrix},$$

then $X := [1,2,3,4]^T$.

Substituting Eq. (15)-(20) into Eq. (13) and (14), we obtain the gradient of the log likelihood function. Algorithm 1 in FIG. 3 shows the learning algorithm based on Stochastic Gradient Ascent. Stochastic Gradient means conducting gradient ascent from one instance to another. In our case, an instance corresponds to a query.

In inference, we calculate the ranking scores of documents with respect to a new query in the following way.

$$\hat{y} = \underset{y}{\operatorname{argmax}} \Pr(y \mid x; \theta) = (\alpha^T eI + \beta D - \beta S)^{-1} X \alpha. \quad (21)$$

Note that here the inference can be conducted with matrix computation, which is different from that in conventional CRF. The reason is that in Continuous CRF the output variable is continuous, while in conventional CRF it is discrete.

If we ignore the relation between documents and set $\beta=0$, then the ranking model degenerates to $$\hat{y} = X \alpha$$

which is equivalent to a linear model used in conventional local ranking.

For n documents, the time complexity of straightforwardly computing the ranking model (21) is of order $O(n^3)$ and thus it is ex-pensive. The main cost of the computation comes from matrix inversion. In this paper we employ a fast computation technique to quickly perform the task. First, we make S a sparse matrix, which has at most k non-zero values in each row and each column. We can do so by only considering the similarity between each document and its $\frac{k}{2}$ nearest neighbors. Next, we use the Gibbs-Poole-Stockmeyer algorithm to convert S to a banded matrix. Finally we solve the following system of linear equation and take the solution as ranking scores.

$$(\alpha^T eI + \beta D - \beta S)\hat{y} = X\alpha \quad (22)$$

Let $A = \alpha^T eI + \beta(D-S)$. A is a banded matrix when S is a banded matrix. Then, the scores $\hat{y}$ in Eq. (22) can be computed with time complexity of O(n) when k<<n[6]. That is to say, the time complexity of testing a new query is comparable with those of existing local ranking methods.

We can also specify Continuous CRF to make it suitable for Topic Distillation. Here we assume that the parent-child relation between two pages is given. The input vectors are also defined. What we need to do is to specify the feature functions.

We define the vertex feature function $f_k(y_i,x)$ in the same way as that in Eq. (8). Furthermore, we define the only edge feature function as $$g(y_i, y_j, x) = R_{i,j}(y_i - y_j), \quad (23)$$

where $R_{i,j}$ denotes the parent-child relation: $R_{i,j}=1$ if document i is the parent of j, and $R_{i,j}=0$ for other cases.

The Continuous CRF for Topic Distillation then becomes $$\Pr(y \mid x) = \frac{1}{Z(x)} \exp \left\{ \sum_i \sum_{k=1}^{K1} -\alpha_k (y_i - x_{i,k})^2 + \sum_{i,j} \beta R_{i,j}(y_i - y_j) \right\}, \quad (24)$$

where Z(x) is defined as $$Z(x) = \int_y \exp \left\{ \sum_i \sum_{k=1}^{K1} -\alpha_k (y_i - x_{i,k})^2 + \sum_{i,j} \beta R_{i,j}(y_i - y_j) \right\} dy. \quad (25)$$

To guarantee that $$\exp \left\{ \sum_i \sum_{k=1}^{K1} -\alpha_k (y_i - x_{i,k})^2 + \sum_{i,j} \beta R_{i,j}(y_i - y_j) \right\}$$

is integrable, we must have $\alpha_k > 0$.

The Continuous CRF can naturally model Topic Distillation. First, if the value of $x_{i,k}$ is high, then the value of $y_i$ is high with high probability. Second, if the value of $R_{i,j}$ is one, then the value of $y_i - y_j$ is high with high probability.

With some derivation, we have $$Z(x) = (2a)^{-\frac{n}{2}} (2\pi)^{\frac{n}{2}} \exp\left( \frac{1}{4a} b^T b - c \right), \quad (26)$$

where n is the number of documents for this query, and $a = \alpha^T e$, $b = 2X\alpha + \beta(D_r - D_c)e$, $D_r$ and $D_c$ are two diagonal matrixes with $$D_{ri,i} = \sum_j R_{i,j} \text{ and}$$

$$D_{ci,i} = \sum_j R_{j,i}, c = \sum_i \sum_{k=1}^{K_1} \alpha_k x_{i,k}^2.$$

In learning, we use Gradient Ascent to maximize the log likelihood. Again, we use the technique for optimization to guarantee $\alpha_k > 0$. We compute the derivative of $L(\theta)$ with respect to $\beta$ and the new optimization variable log $\alpha_k$ as follows.

$$\nabla_{\log \alpha_k} = \frac{\partial L(\theta)}{\partial \log \alpha_k} = \alpha_k \sum_{q=1}^{N} \left\{ \sum_i -\left(y_i^{(q)} - x_{i,k}^{(q)}\right)^2 - \frac{\partial \log Z(x^{(q)})}{\partial \alpha_k} \right\} \quad (27)$$

$$\nabla_{\beta} = \frac{\partial L(\theta)}{\partial \beta} = \sum_{q=1}^{N} \left\{ \sum_{i,j} R_{i,j}^{(q)} \left(y_i^{(q)} - y_j^{(q)}\right) - \frac{\partial \log Z(x^{(q)})}{\partial \beta} \right\} \quad (28)$$

Now we show how to get the partial derivative $$\frac{\partial \log Z(x^{(q)})}{\partial \alpha_k} \text{ and } \frac{\partial \log Z(x^{(q)})}{\partial \beta}.$$

For simplicity, we omit the super script (q) hereafter.

$$\frac{\partial \log Z(x)}{\partial \alpha_k} = -\frac{n}{2a} - \frac{1}{4a^2} b^T b + \frac{1}{2a} b^T X_k - \sum_i x_{i,k}^2 \quad (29)$$

$$\frac{\partial \log Z(x)}{\partial \beta} = \frac{1}{2a} b^T (D_r - D_c) e \quad (30)$$

where $X_k$ denotes the k-th column of matrix X.

Substituting Eq. (29) and (30) into Eq. (27) and (28), we obtain the gradient of the log likelihood function. Due to space limitation, we omit the details of the learning algorithm, which is similar to Algorithm 1, shown in FIG. 3.

In inference, we calculate the ranking scores of documents with respect to a new query in the following way.

$$\hat{y} = \arg\max_y PR(y \mid x; \theta) = \frac{1}{\alpha^T e} (2X\alpha + \beta(D_r - D_c)e) \quad (31)$$

Similarly to Pseudo Relevance Feedback, if we ignore the relation between documents and set $\beta = 0$, the ranking model degenerates to a linear ranking model in conventional local ranking.

We can also conduct multiple global ranking tasks simultaneously. For example, we can combine Pseudo Relevance Feedback and Topic Distillation by using the following Continuous CRF model $$Pr(y \mid x) =$$

-continued $$\frac{1}{Z(x)} \exp \left\{ \sum_i \sum_{k=1}^{K_1} -\alpha_k (y_i - x_{i,k}) + \sum_{i,j} \left( \beta_1 R_{i,j} (y_i - y_j) - \beta_2 \frac{S_{i,j}}{2} (y_i - y_j)2 \right) \right\}.$$

In this case, the ranking scores of documents for a new query is calculated as follows.

$$\hat{y} = \arg\max_y PR(y \mid x; \theta) = (\alpha^T e I + \beta_2 D - \beta_2 S)^{-1} \left( X\alpha + \frac{\beta_1}{2} (D_r - D_c) e \right)$$

Continuous CRF is a powerful model in the sense that various types of relations can be incorporated as edge feature functions.

6. Experiments

We applied Continuous CRF to Pseudo Relevance Feedback and Topic Distillation. We also compared the performances of Continuous CRF model against several baseline methods in the two tasks. As data, we used LETOR, which is a dataset for learning to rank research. We made use of OHSUMED in LETOR for Pseudo Relevance Feedback and TREC in LETOR for Topic Distillation. As evaluation measure, we utilized NDCG@n (Normalized Discounted Cumulative Gain).

The OHSUMED dataset in LETOR is derived from the OHSUMED data for research on relevance search. The document collection is a subset of MEDLINE, a database on medical publications.

There are 106 queries in OHSUMED data set, each associated with a number of documents. The relevance degrees of documents with respect to the queries are judged by humans, on three levels: definitely relevant, partially relevant, or not relevant. There are in total 16,140 query-document pairs with relevance judgments. Each query-document pair is represented by a 25 dimension feature vector, which means $K_1 = 25$ in Eq. (10).

Similarity between documents is provided as relation information in the data, which is defined in the following way. First stop words are removed from the documents. Each document is represented as a term vector in the vector space model. Then the similarity $S_{i,j}$ between two documents i and j is calculated as co-sine between the term vectors of the two documents. (One should not confuse the term vector with the input vector in learning.)

6.1.2 Baseline Methods

As baseline methods, we used RankSVM and ListNet. RankSVM is a state-of-the-art algorithm of the pairwise approach to learning to rank, and ListNet is a state-of-the-art algorithm of the listwise approach.

The two learning to rank methods only use content information, but not relation information. To make fair comparisons, we added post processing to the two methods in which we incorporated relation information into the final ranking model creation. We refer to the methods as 'RankSVM plus relation' (RankSVM+R) and 'List-Net plus relation' (List-Net+R). Following prior work, we first calculated the scores of documents based on content information using a learning to rank method (RankSVM or ListNet), then propagated the scores using similarities between documents, and finally ranked the documents based on the propagated scores. Specifically, the final score list is calculated as $$y_{+r} = (I + \beta(D-S))^{-1} y,$$

where y is the score list output by a learning algorithm (e.g. RankSVM or ListNet), and D and S are the same as those in Eq. (12). Here, is a parameter balancing the influence from content information and relation information.

For reference purposes, we also tried BM25 and Pseudo Relevance Feedback based on BM25. For the two baselines, we used the tools provided in Lemur toolkit. We conducted 5 fold cross validation for Continuous CRF and all the baseline methods, using the partition provided in LETOR.

Continuous CRF needs to use queries, their associated documents, and relevance scores as training data. Since LETOR only provides relevance labels, we mapped the labels to scores using heuristics. The rule is the ground truth score of a relevant document should be larger than that of an irrelevant document. We used validation set in LETOR to select the best mapping function.

For RankSVM+R and ListNet+R, we ran a number of experiments based on different values of parameter β. Here, we report the best performances of the methods. For RankSVM+R, β=0.2; for ListNet+R, β=0.1.

Table 1 shows the ranking accuracies of BM25, BM25 based Pseudo Relevance Feedback (PRF), RankSVM, List-Net, RankSVM+R ListNet+R, and Continuous CRF (CRF), in terms of NDCG averaged over five trials.

CRF's performance is superior to the performances of RankSVM and ListNet. This is particularly true for NDCG@1; CRF achieves about 5 points higher accuracy than RankSVM and more than 2 points higher accuracy than List-Net. The results indicate that learning with similarity information can indeed improve search relevance.

We can see that CRF performs much better than RankSVM+R and ListNet+R at all NDCG positions. This indicates that with the same information the proposed CRF can indeed perform better than the heuristic baseline methods.

RankSVM+R beats RankSVM largely at NDCG@ 1, while obtains similar results at NDCG@ 3-10, but a worse result at NDCG@2. ListNet+R works better than ListNet at NDCG@ 1, but does not as well as ListNet at the other positions. This seems to indicate that heuristically using relation in post-processing does not work well.

Continuous CRF also outperforms PRF (Pseudo Relevance Feed-back), the traditional method of using similarity information for ranking. The result suggests that it is better to leverage the machine learning techniques in Pseudo Relevance Feedback.

We made analysis on the results and found that CRF can in-deed improve relevance. Table 2 and 3 show the top 10 results of RankSVM and CRF for query "back pain-mri sensitivity etc in comparison to ct of lumbar spine" respectively. The documents in red are 'definitely relevant', documents in blue are 'partially relevant', and documents in black are 'not relevant'.

It is obvious that CRF works better than RankSVM for this query. Document 262357 is a 'definitely relevant' document, but is ranked out of top 10 by RankSVM. Since this document is similar to documents 277424 and 169405 which are ranked at position 2 and 5, it is boosted to position 6 by CRF using similarity information.

In TREC 2004, there was a track for web search, called Topic Distillation, which is aimed at enhancing research on Topic Distillation, the task described in Section 2.

The TREC dataset in LETOR is derived from the TREC 2004 Topic Distillation data. There are 75 queries, and each query associated with about 1,000 documents. Each query document pair is associated with a label, representing whether the document is an entry page to the query (an answer) or not. There are 44 features defined over a query-document pair. It implies that $K_1$=44 in Eq. (24). Furthermore, information on parent-child relation is also given. The element $R_{i,j}$ equals 1 if page i is parent of page j in a website, and equals 0 otherwise.

As baseline methods, we used RankSVM and ListNet. Since RankSVM and ListNet do not use relation information, we tried two modifications of them, in which we used relation in-formation in post processing. We refer to them as 'RankSVM plus relation' (RankSVM+R) and 'ListNet plus relation' (ListNet+R). In RSVM+R (or ListNet+R), we use the ranking score of a child page output by RankSVM (or ListNet) to enhance the ranking score of its parent also output by RankSVM (or ListNet). The idea is similar to that of sitemap based score propagation.

We also tested non-learning methods of BM25 and sitemap based relevance propagation. The basic idea of sitemap based relevance propagation is to use the relevance of a child page to enhance the relevance of its parent page. There are two variants of the method: sitemap based term propagation ('ST' for short) and sitemap based score propagation ('SS' for short).

The following section describes the experimental results of the runs. We conduced 5-fold cross validation on our method and the base-line methods, using the partitions in LETOR. For RankSVM and ListNet, we refer to the results in LETOR.

Continuous CRF needs to use queries, their associated documents, and relevance scores as training data, while LETOR only provides ranking labels. Again, we used heuristics to map ranking labels to ranking score. The rule is that the score of an answer document should be larger than that of a non-answer document. We used the validation set in LETOR to select the best mapping function.

Table 4 in FIG. 7 shows the performances of BM25, SS, ST, RankSVM, ListNet, and CRF model in terms of NDCG averaged over 5 trials.

CRF outperforms RankSVM and ListNet at all NDCG positions. This is particularly true for NDCG@1. CRF achieves 8 points higher accuracy than RankSVM and List-Net, which is a more than 15% relative improvement. Overall, learning using relation information can achieve better results than learning without using relation information. The result indicates that our method can effectively use the information in training of a Topic Distillation model.

CRF performs much better than RankSVM+R and List-Net+R at all NDCG positions. This indicates that with the same information the proposed CRF can indeed perform better than the heuristic methods.

RankSVM+R beats RankSVM largely at NDCG@1, while obtains slightly better results at NDCG@3-10 but a slightly worse result at NDCG@2. ListNet+R works better than List-Net at NDCG@2-10, but does not at NDCG@1. The results seem to indicate that simply using relation information as post-processing does not work very well.

Continuous CRF also outperforms SS and ST, the traditional method of using parent-child information for Topic Distillation. The result suggests that it is better to leverage the machine learning techniques using both content information and relation information in ranking.

We investigated the reason that CRF can achieve better results than other algorithms and concluded that it is because CRF can successfully leverage the relation information in ranking. Without loss of generality, we make a comparison between CRF and RankSVM.

Table 5 show top 10 results of RankSVM and CRF for query "HIV/AID." The answer pages for this query are in red color. The answer page 643908 is not ranked in top 10 by RankSVM, because its content feature is not strong. Since the content features of its child pages (such as 220602, 887722, and other pages) are very strong, CRF can effectively use the parent-child relation information and boost it to position 4.

TABLE 5

Top 10 Results of RankSVM and CRF

| Doc ID | URL |
|---|---|
| | Results of RankSVM |
| 54703 | http://hab.hrsa.gov/ |
| 220602 | http://www.cdc.gov/hiv/dhap.htm |
| 887722 | http://www.cdc.gov/hiv/hivinfo.htm |
| 220487 | http://www.fda.gov/oashi/aids/hiv.html |
| 28888 | http://www.usinfo.state.gov/topical/global/hiv/ |
| 521604 | http://www.cdc.gov/hiv/pubs/brochure/atrisk.htm |
| 862409 | http://www.cdc.gov/hiv/hivaids.htm |
| 390722 | http://www.hud.gov/o ces/cpd/aidshousing/index.cfm |
| 219192 | http://www.niaid.nih.gov/newsroom/.../default.htm |
| 454764 | http://www.cdc.gov/hiv/graphics/adolesnt.htm |
| | Results of CRF |
| 54703 | http://hab.hrsa.gov/ |
| 3477 | http://www.hiv.omhrc.gov/ |
| 220602 | http://www.cdc.gov/hiv/dhap.htm |
| 643908 | http://www.cdc.gov/hiv/index.htm |
| 28888 | http://www.usinfo.state.gov/topical/global/hiv/ |
| 334549 | http://www.surgeongeneral.gov/aids/default.htm |
| 45756 | http://www.metrokc.gov/health/apu/ |
| 219192 | http://www.niaid.nih.gov/newsroom/.../default.htm |
| 321364 | http://www.metrokc.gov/health/apu/epi/index.htm |
| 547722 | http://www.usaid.gov/pop_health/.../index.html |

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. An improved method for ranking documents using a ranking model, the method comprising:
    obtaining a data set, wherein the data set includes a plurality of documents and document metadata, wherein the document metadata describes relationships between the documents;
    maximizing a likelihood figure by employing a gradient ascent that utilizes the document metadata and the relationship descriptions to determine the likelihood figure;
    modifying parameters of the ranking model, wherein the parameters are modified by the use of the likelihood, wherein the ranking model employs a Continuous Conditional Random Field, and wherein the ranking model utilizes a conditional probability distribution representing a mapping relationship from the plurality of documents to associated ranking scores represented by continuous variables; and
    ranking the documents by the use of the modified parameters, wherein the ranking of the documents is consistent with the document metadata.

2. The method of claim 1, wherein the step of maximizing a likelihood includes the use of a specific function that processes data describing content similarity relationships between the documents.

3. The method of claim 2, wherein the specific function utilizes:

$$g(y_i, y_j, x) = -\frac{1}{2} S_{i,j}(y_i - y_j)^2,$$

wherein $S_{i,j}$ similarity between a first Document $d_i$ and a second document $d_j$.

4. The method of claim 1, wherein the step of maximizing a likelihood includes the use of a specific function that processes data describing parent-child relationships between the documents.

5. The method of claim 4 wherein the specific function utilizes:
    $g(y_i,y_j,x)=R_{i,j}(y_i-y_j)$, where $R_{i,j}$ denotes the parent-child relation:
    $R_{i,j}=1$ if document i is the parent of j, and $R_{i,j}=0$ for other cases.

6. The method of claim 1, wherein the metadata that describes relationships between the documents includes hyperlinks.

7. A system for ranking documents using a ranking model, the system comprising:
    a component for obtaining a data set, wherein the data set includes a plurality of documents and document metadata, wherein the document metadata describes relationships between the documents;
    a component for maximizing a likelihood figure by employing a gradient ascent that utilizes the document metadata and the relationship descriptions to determine the likelihood figure, wherein maximizing the likelihood figure is performed by a processor executing instructions stored in a memory;
    a component for modifying parameters of the ranking model, wherein the parameters are modified by the use of the likelihood, wherein the ranking model employs a Continuous Conditional Random Field, and wherein the ranking model utilizes a conditional probability distribution representing a mapping relationship from the plurality of documents to associated ranking scores represented by continuous variables; and
    a component for ranking the documents by the use of the modified parameters, wherein the ranking of the documents is consistent with the document metadata.

8. The system of claim 7, wherein the component for maximizing a likelihood includes the use of a specific function that processes data describing content similarity relationships between the documents.

9. The system of claim 8, wherein the specific function utilizes:

$$g(y_i, y_j, x) = -\frac{1}{2} S_{i,j}(y_i - y_j)^2,$$

wherein $S_{i,j}$ is similarity between a first document $d_i$ and a second document $d_j$.

10. The system of claim 7, wherein the component for maximizing a likelihood includes the use of a specific function that processes data describing parent-child relationships between the documents.

11. The system of claim 10, wherein the specific function utilizes:
    $g(y_i,y_j,x)=R_{i,j}(y_i-y_j)$, where $R_{i,j}$ denotes the parent-child relation:
    $R_{i,j}=1$ if document i is the parent of j, and $R_{i,j}=0$ for other cases.

12. The system of claim 7, wherein the metadata that describes relationships between the documents includes hyperlinks.

13. The system of claim 7, wherein the system further comprises a component for executing additional iterations to further the modifications to the parameters.

14. A non-transitory computer-readable storage media comprising computer executable instructions to, upon execution, perform a process for ranking documents using a ranking model, the process including:
   obtaining a data set, wherein the data set includes a plurality of documents and document metadata, wherein the document metadata describes relationships between the documents;
   maximizing a likelihood figure by employing a gradient ascent that utilizes the document metadata and the relationship descriptions to determine the likelihood figure;
   modifying parameters of the ranking model, wherein the parameters are modified by the use of the likelihood, wherein the ranking model employs a Continuous Conditional Random Field, and wherein the ranking model utilizes a conditional probability distribution representing a mapping relationship from the plurality of documents to associated ranking scores represented by continuous variables; and
   ranking the documents by the use of the modified parameters, wherein the ranking of the documents is consistent with the document metadata.

15. The non-transitory computer-readable storage media of claim 14, wherein the process of maximizing a likelihood includes the use of a specific function that processes data describing content similarity relationships between the documents.

16. The non-transitory computer-readable storage media of claim 15, wherein the specific function utilizes:

$$g(y_i, y_j, x) = -\frac{1}{2} S_{i,j}(y_i - y_j)^2,$$

wherein $S_{i,j}$ is similarity between a first document $d_i$ and a second document $d_j$.

17. The non-transitory computer-readable storage media of claim 14, wherein the process of maximizing a likelihood includes the use of a specific function that processes data describing parent-child relationships between the documents.

18. The non-transitory computer-readable storage media of claim 17, wherein the specific function utilizes:

$$g(y_i, y_j, x) = R_{i,j}(y_j - y_i),$$

where $R_{i,j}$ denotes the parent-child relation:
$R_{i,j}=1$ if document i is the parent of j, and $R_{i,j}=0$ for other cases.

19. The non-transitory computer-readable storage media of claim 14, wherein the metadata that describes relationships between the documents includes hyperlinks.

20. The non-transitory computer-readable storage media of claim 14, wherein the system further comprises a process for executing additional iterations to further the modifications to the parameters.

21. The method of claim 1, wherein the Continuous Conditional Random Field is defined on a graph.

* * * * *